United States Patent
Park et al.

(10) Patent No.: US 7,885,055 B2
(45) Date of Patent: Feb. 8, 2011

(54) SLIDING MODULE HAVING LOCKING FUNCTION IN PORTABLE ELECTRONIC DEVICE

(75) Inventors: Sang-Chun Park, Suwon-si (KR); Jae-Sam Youn, Suwon-si (KR); Byoung-Soo Lee, Yongin-si (KR); Sung-Eun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/122,435

(22) Filed: May 16, 2008

(65) Prior Publication Data
US 2008/0304218 A1 Dec. 11, 2008

(30) Foreign Application Priority Data
Jun. 11, 2007 (KR) ............... 10-2007-0056757

(51) Int. Cl.
H04M 1/00 (2006.01)
H05K 5/00 (2006.01)
H05K 7/00 (2006.01)

(52) U.S. Cl. .................. 361/679.01; 455/575.4
(58) Field of Classification Search ........... 361/679.01; 74/99, 101, 102; 455/575.1, 575.4
See application file for complete search history.

(56) References Cited

U.S. PATENT DOCUMENTS

| | | | |
|---|---|---|---|
| 6,947,778 B2 * | 9/2005 | Tsai | 455/575.4 |
| 7,084,345 B1 * | 8/2006 | Chen et al. | 174/545 |
| 7,162,283 B2 * | 1/2007 | Bae et al. | 455/575.4 |
| 7,181,257 B2 * | 2/2007 | Gordecki | 455/575.4 |
| 7,184,806 B2 * | 2/2007 | Bae | 455/575.4 |
| 7,218,731 B2 * | 5/2007 | Turunen | 379/433.12 |
| 7,257,432 B2 * | 8/2007 | Nan | 455/575.4 |
| 7,417,865 B2 * | 8/2008 | Kim | 361/727 |
| 7,433,723 B2 * | 10/2008 | Bae | 455/575.4 |
| 7,463,913 B2 * | 12/2008 | Nagashima | 455/575.4 |
| 7,492,892 B2 * | 2/2009 | Lee et al. | 379/433.12 |
| 7,496,389 B2 * | 2/2009 | Cho et al. | 455/575.4 |
| 7,599,723 B2 * | 10/2009 | Lee et al. | 455/575.4 |
| 7,613,485 B2 * | 11/2009 | Chen et al. | 455/575.4 |
| 7,636,591 B2 * | 12/2009 | Kim et al. | 455/575.4 |
| 7,774,033 B2 * | 8/2010 | Lee | 455/575.4 |
| 2004/0157653 A1 * | 8/2004 | Kato | 455/575.4 |

FOREIGN PATENT DOCUMENTS

| | | |
|---|---|---|
| KR | 1020060009104 | 1/2006 |
| KR | 100678060 | 1/2007 |

* cited by examiner

*Primary Examiner*—Jayprakash N Gandhi
*Assistant Examiner*—Adrian S Wilson
(74) *Attorney, Agent, or Firm*—H.C. Park & Associates, PLC

(57) ABSTRACT

A sliding module includes a main housing; a sliding housing on the main housing, a push rod interposed between the main housing and the sliding housing to provide an elastic force to slide the sliding housing, a support member mounted on the main housing and rotatably or slidably coupled with the push rod, and a locking member disposed on the push rod and the support member. The locking member blocks the push rod to limit the sliding of the push rod on the support member and allows the push rod to slide when the push rod rotates on the support member according to the sliding of the sliding housing.

20 Claims, 16 Drawing Sheets

SLIDING MODULE HAVING LOCKING FUNCTION IN PORTABLE ELECTRONIC DEVICE

CROSS REFERENCE TO RELATED APPLICATION

This application claims priority from and the benefit of Korean Patent Application No. 10-2007-0056757, filed on Jun. 11, 2007, which is hereby incorporated by reference for all purposes as if fully set forth herein.

BACKGROUND OF THE INVENTION

1. Field of the Invention

The present invention relates to a sliding module having a locking function in a portable electronic device, and more particularly to a sliding module having a locking function including a push rod that may be driven in a stable manner regardless of the sliding direction of a bidirectional sliding housing.

2. Discussion of the Background

In general, a portable electronic device refers to a device, such as a portable terminal, an MP3 player, or a PMP, which a user may carry and use to enjoy various contents. A portable terminal is a compact portable electronic communication device, and may be classified as a bar-type terminal, a flip-type terminal, or a folder-type terminal according to its appearance.

A sliding-type portable terminal has a pair of housings that are slidably assembled by a sliding module, and an automatic/semiautomatic operation may be implemented through an elastic member.

Further, a sliding-type portable terminal that slides in two or more directions to provide various functions has been developed in addition to a sliding-type portable terminal that only slides in one direction.

FIG. 1, FIG. 2, and FIG. 3 show a sliding-type portable terminal that slides open in two directions.

Referring to FIG. 1, FIG. 2, and FIG. 3, a conventional sliding-type portable terminal includes a sliding housing 20, a main housing 10, and a sliding module to slide the sliding housing 20 in two directions.

The sliding module includes a push rod 30 and a support member 14 on which the push rod 30 is mounted to slide the sliding housing 20 in two directions. The sliding module is mounted on a surface of the main housing 10 that faces the sliding housing 20 so that the sliding housing 20 can slide open to expose one of the side surfaces of the main housing 10. The ends of the push rod 30 are coupled with the main housing 10 and the sliding housing 20, respectively, to provide a driving force to slide the sliding housing 20 and the main housing 10. The support member 14 supports the push rod 30 when the sliding housing 20 slides on the main housing 10.

The push rod 30 includes a first engaging portion 31 supported by the support member 14 and a second engaging portion 32 rotatably coupled with the sliding housing 20.

The support member 14 includes an upper groove 11 and a lower groove 12 adjacent to each other, and a threshold 13 protruding between the upper groove 11 and the lower groove 12 to limit the sliding of the push rod 30 and guide the sliding housing 20.

Hereinafter, the operation of the push rod 30 according to the sliding of the sliding housing 20 in the conventional portable terminal having the above-described configuration will be described.

Referring to FIG. 2, when the sliding housing 20 slides in a first direction of the main housing 10 while facing the main housing 10 from a state in which the sliding housing 20 is closed on the main housing 10, the first engaging portion 31 rotates on the upper groove 11, and the second engaging portion 32 moves about the first engaging portion 31 in the sliding direction to open the other side surface of the main housing 10.

Further, referring to FIG. 3, when the sliding housing 20 slides in a second direction of the main housing 10, which is opposite the first direction, while facing the main housing 10 from a state in which the sliding housing 20 is closed on the main housing 10, the first engaging portion 31 separates from the upper groove 11 and moves to the lower groove 12 along the threshold 13, and the second engaging portion 32 moves in the sliding direction to open one side surface of the main housing 10.

However, when the sliding housing 20 slides toward the main housing 10 to close the main housing 10 while facing the main housing 10, the first engaging portion 31 should only rotate on the upper groove 11. However, the first engaging portion 31 may slide from the upper groove 11 due to the push force applied in the sliding direction of the sliding housing 20, so the first engaging portion 31 separates from the upper groove 11.

To prevent this, the threshold 13 may protrude between the upper groove 11 and the lower groove 12. However, when the sliding housing 20 slides toward the main housing 10 to be closed on the main housing 10, the sliding housing 20 may not slide depending on the protruding state of the threshold 13. The sliding housing 20 also may not slide smoothly if the force applied to slide the sliding housing 20 is greater than what is required.

Therefore, a sliding module, which prevents the first engaging portion 31 from sliding on the upper groove 11 when the sliding housing 20 slides on the main housing 10, is required.

Further, a sliding module having a threshold 13 that protrudes less, and is therefore capable of sliding of the sliding housing 20 smoothly, has been required.

SUMMARY OF THE INVENTION

The present invention provides a sliding module having a locking function in a portable electronic device, the sliding module including a push rod that may be driven in a stable manner regardless of the sliding direction of a bi-directional sliding housing.

The present invention also provides a sliding module having a locking function in a portable electronic device, the sliding module including a push rod that may remained engaged with an upper groove when a sliding housing slides.

The present invention also provides a sliding module having a locking function in a portable electronic device, which may slide the sliding housing smoothly due to the inclusion of a threshold that protrudes to a lesser degree than that of a conventional sliding modules.

Additional features of the invention will be set forth in the description which follows, and in part will be apparent from the description, or may be learned by practice of the invention.

The present invention discloses a sliding module having a locking function in a portable electronic device, including a main housing; a sliding housing on the main housing, a push rod interposed between the main housing and the sliding housing, a support member mounted on the main housing and rotatably or slidably coupled with the push rod, and a locking member disposed on the push rod and the support member. The push rod provides an elastic force to slide the sliding housing on the main housing, and the locking member blocks the push rod to limit the sliding of the push rod on the support member and allows the push rod to slide when the push rod rotates on the support member according to the sliding of the sliding housing.

The present invention also discloses a sliding module having a locking function in a portable electronic device, including a main housing, a sliding housing on the main housing, an elastic member mounted between the main housing and the sliding housing, a support member mounted on the main housing, and a locking member to selectively block the elastic member according to the sliding of the sliding housing. The elastic member provides an elastic force to slide the sliding housing on the main housing, and the support member is rotatably coupled with the elastic member to guide movement of the elastic member.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of this invention, and together with the description serve to explain the principles of the invention.

DETAILED DESCRIPTION OF THE ILLUSTRATED EMBODIMENTS

Figure 1:
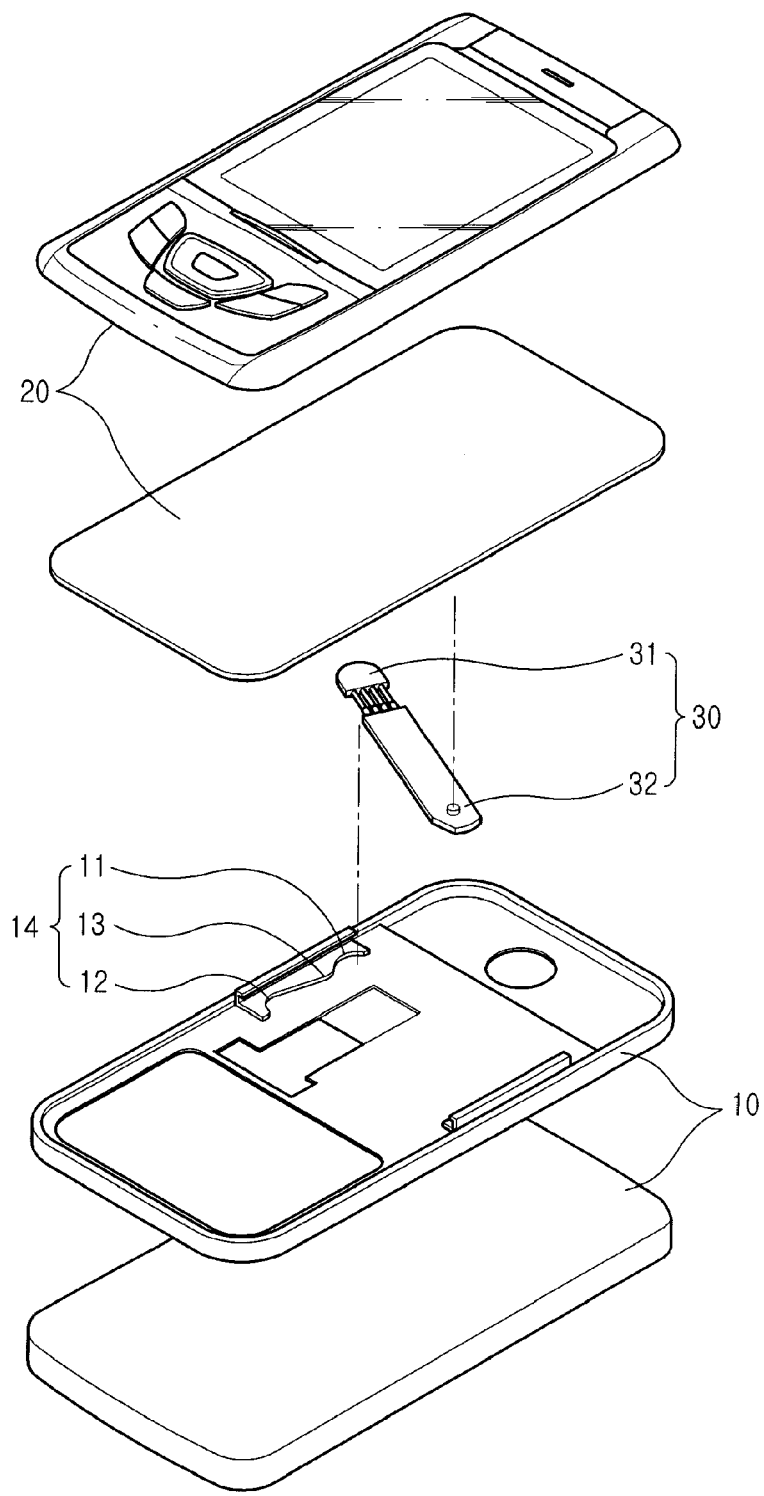
FIG. 1 is an exploded perspective view showing a conventional portable electronic device.
Figure 2:
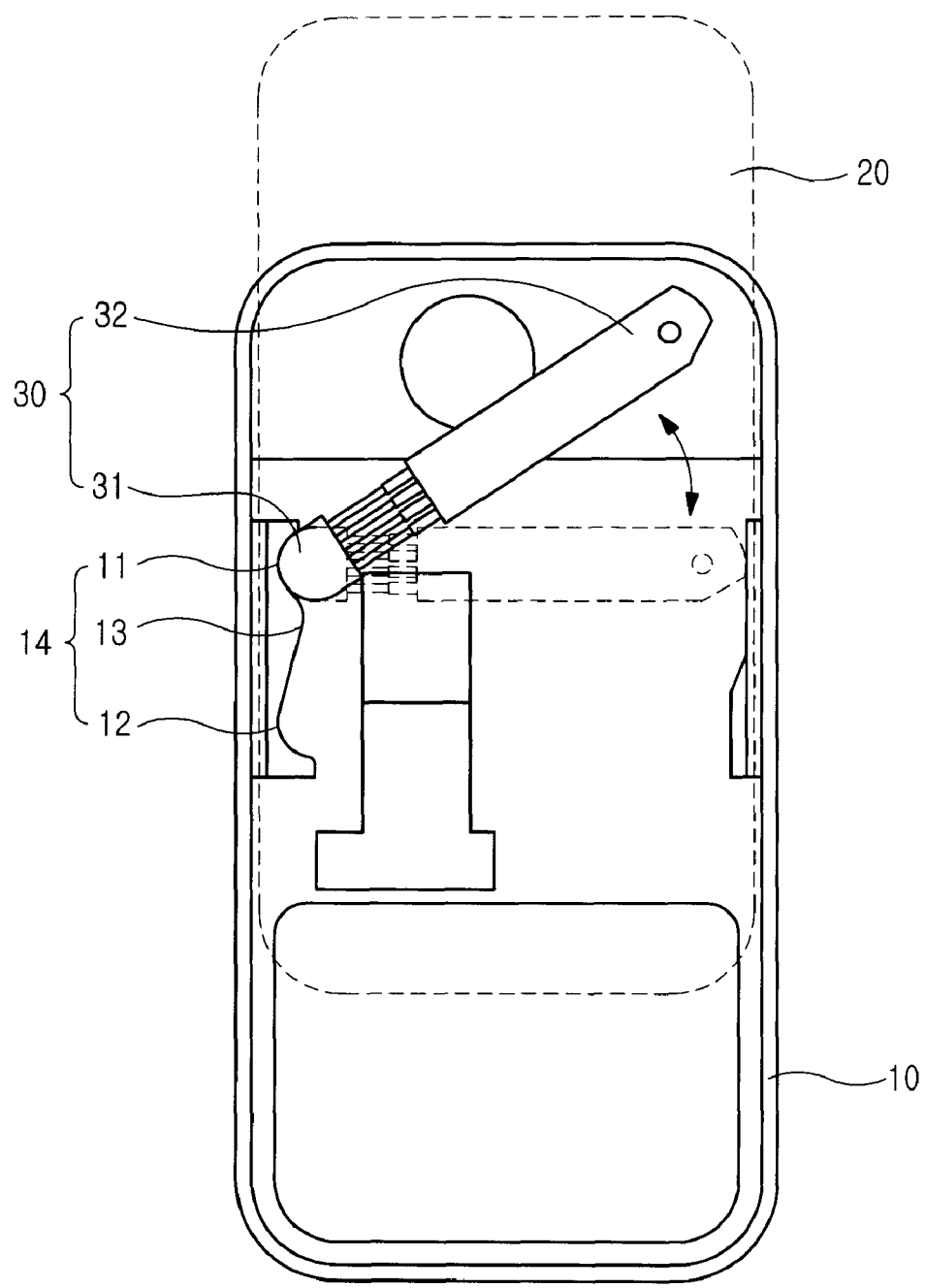
FIG. 2 shows the operation of an elastic member in a sliding module for a conventional portable electronic device when a sliding housing slides toward a first side of a main housing.
Figure 3:
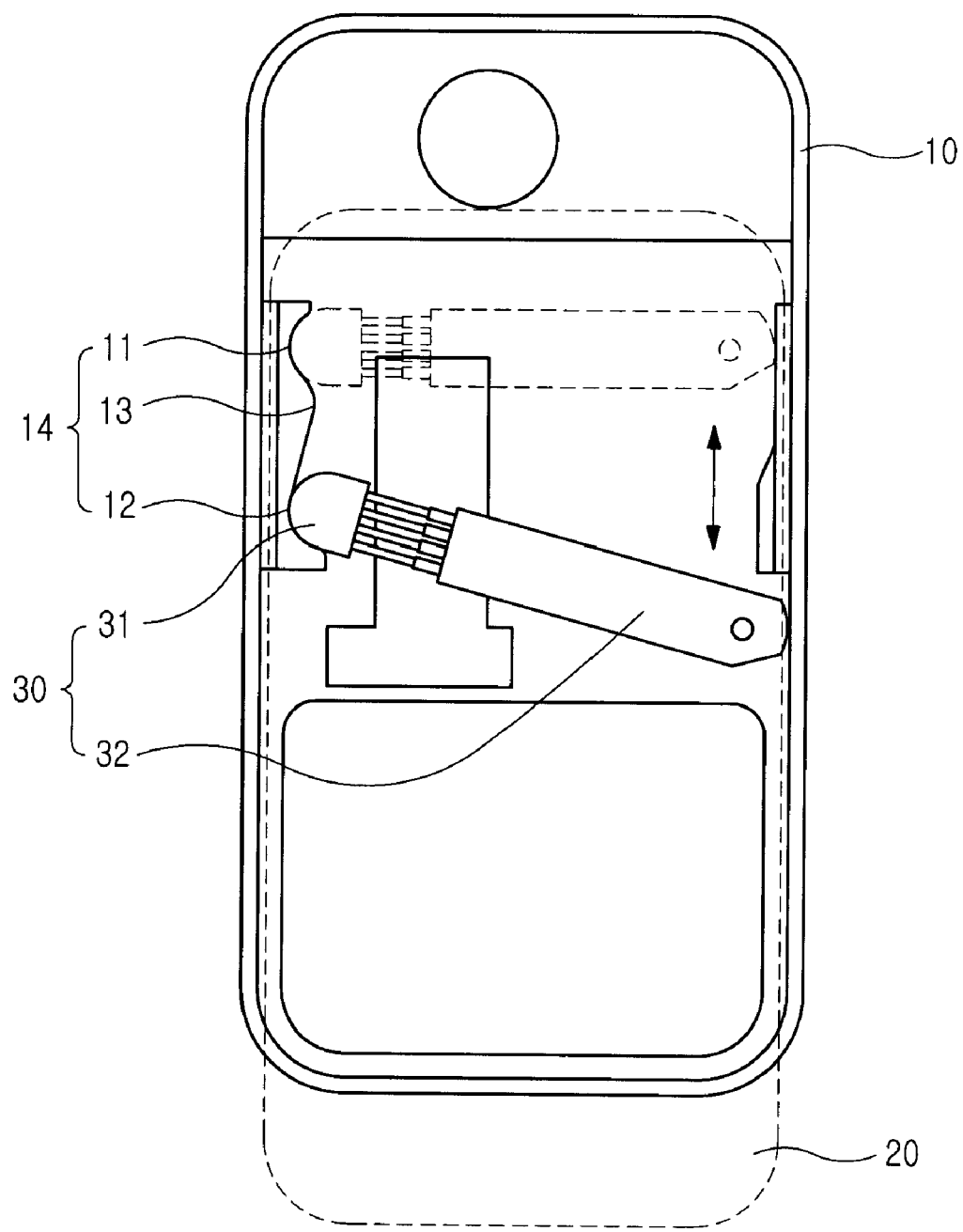
FIG. 3 is a view showing the operation of an elastic member in a sliding module for a conventional portable electronic device when a sliding housing slides toward a second side of a main housing.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As shown in FIG. 4, FIG. 5, FIG. 7, and FIG. 11, a sliding module for a portable electronic device includes a main housing 10, a sliding housing 20 on the main housing 10, a push rod 100 to slide the sliding housing 20 on the main housing 10, and a support member 200. The push rod 100 provides an elastic force to slide the sliding housing 20 and is positioned between the main housing 10 and the sliding housing 20. The push rod 100 rotates or slides on the main housing 10 according to the sliding of the sliding housing 20. The support member 200 is coupled with one side of the push rod 100 to rotate or slide the push rod 100, and also is mounted on the main housing 10.

Referring to FIG. 4, FIG. 5, FIG. 6, FIG. 7, FIG. 8, FIG. 9, FIG. 10, FIG. 11, and FIG. 12, the sliding module having a locking function in the portable electronic device includes a locking member 300 disposed on a first end of the push rod 100 and a first end of the support member 200. The locking member 300 selectively blocks the push rod 100 to limit the sliding of the push rod 100 when the push rod 100 rotates on the support member 200 according to the sliding of the sliding housing 20.

Referring to FIG. 4, FIG. 6, FIG. 8, and FIG. 9, the push rod 100 includes small-diameter rod members 130, which each have a spring, a support body 110, and a sliding support body 120. The support body 110 rotates or slides on the support member 200 according to the sliding of the sliding housing 20, and the sliding support body 120 is disposed on a second end of the push rod 100 and is coupled with the sliding housing 20.

Referring to FIG. 4, FIG. 6, FIG. 8, FIG. 9, FIG. 10, and FIG. 12, the support member 200 includes an upper groove 210, a lower groove 220, and a guide protrusion 230. The upper groove 210 is disposed on a first side surface of the main housing 10 to be rotatably coupled with the support body 110, the lower groove 220 is disposed adjacent to the upper groove 210 in a sliding direction of the main housing 10 and is coupled with the support body 110, and the guide protrusion 230 protrudes between the upper groove 210 and the lower groove 220 to guide the sliding of the support body 110.

Referring to FIG. 4, FIG. 6, FIG. 8, FIG. 9, FIG. 10, and FIG. 12, the locking member 300 includes a first locking portion 310 and a second locking portion 320. The first locking portion 310 protrudes from the push rod 100 to be engaged with the second locking portion 320 in a predetermined section according to the rotation of the first side of the push rod 100 that is coupled with the support member 200, and the second locking portion 320 protrudes from the support member 200 to be engaged with or disengaged from the first locking portion 310 according to the rotation of the push rod 100.

Referring to FIG. 4, FIG. 6, FIG. 8, FIG. 9, FIG. 10, and FIG. 12, the first locking portion 310 protrudes from one side of the support body 110, and the first locking portion 310 may be engaged with the second locking portion 320 according to the rotation of the support body 110 to block the sliding of the support body 110 on the support member 200, or may be disengaged from the second locking portion 320 according to the rotation of the support body 110 to make the support body 110 separate from the support member 200.

Referring to FIG. 4, FIG. 6, FIG. 8, and FIG. 9, the first locking portion 310 may be a latching protrusion that protrudes from one side of the support body 110.

Figure 4:
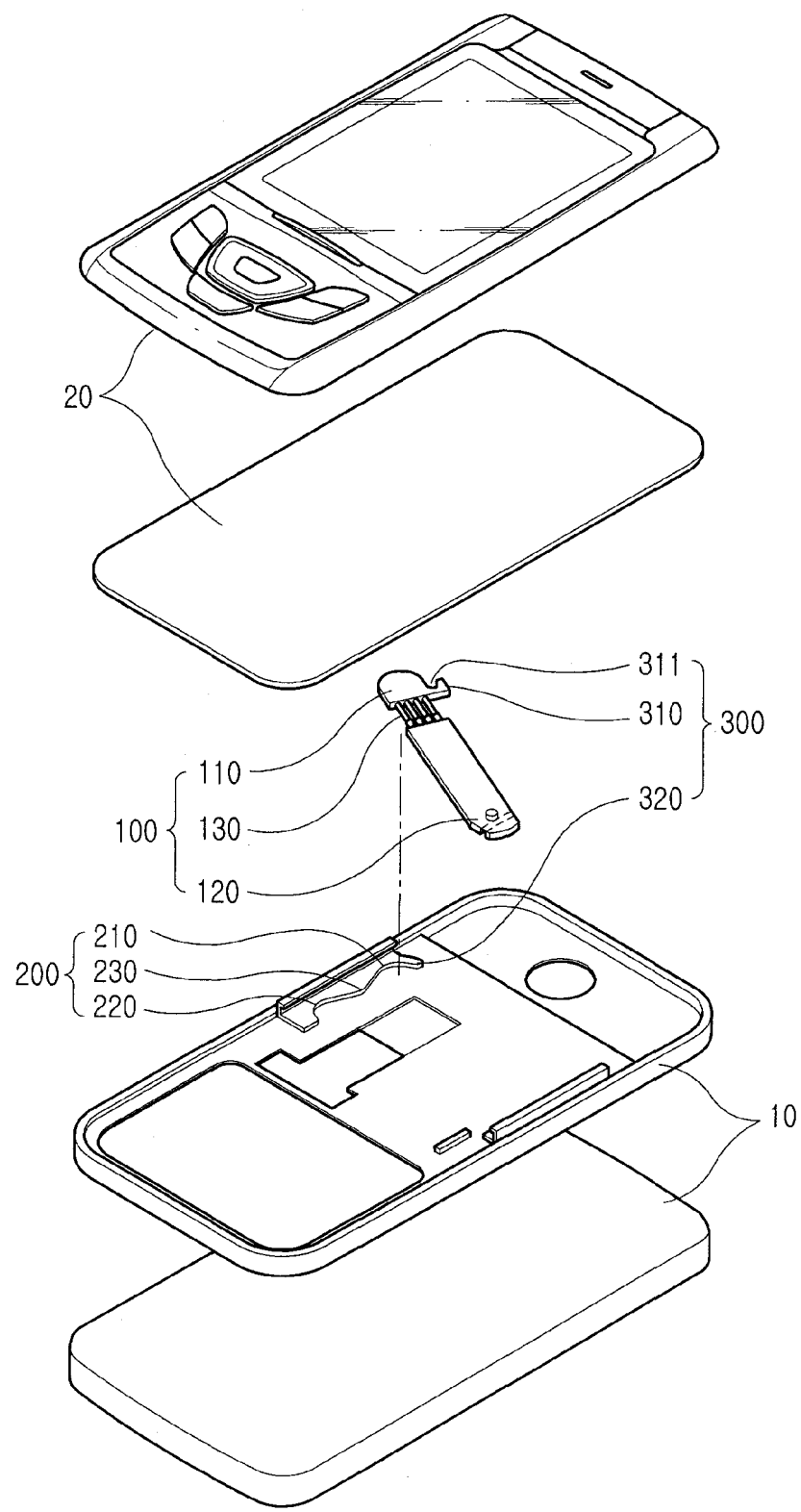
FIG. 4 is an exploded perspective view showing a portable electronic device having a locking function according to an exemplary embodiment of the present invention.

As shown in FIG. 4, a latching groove 311 is disposed between the support body 110 and the latching protrusion 310 to be engaged with the second locking portion 320.

Referring to FIG. 4, FIG. 6, FIG. 8, FIG. 9, FIG. 10, and FIG. 12, the second locking portion 320 protrudes from the upper groove 210, is inserted in the latching groove 311, and is engaged with the latching protrusion 310 according to the rotation of the support body 110 to block the sliding of the support body 110. Otherwise, the second locking portion 320 is disengaged from the latching protrusion 310 according to the rotation of the support body 110 to allow the support body 110 to slide.

As shown in FIG. 4, the second locking portion 320 may be a locking protrusion protruding from the upper groove 210.

Figure 6:
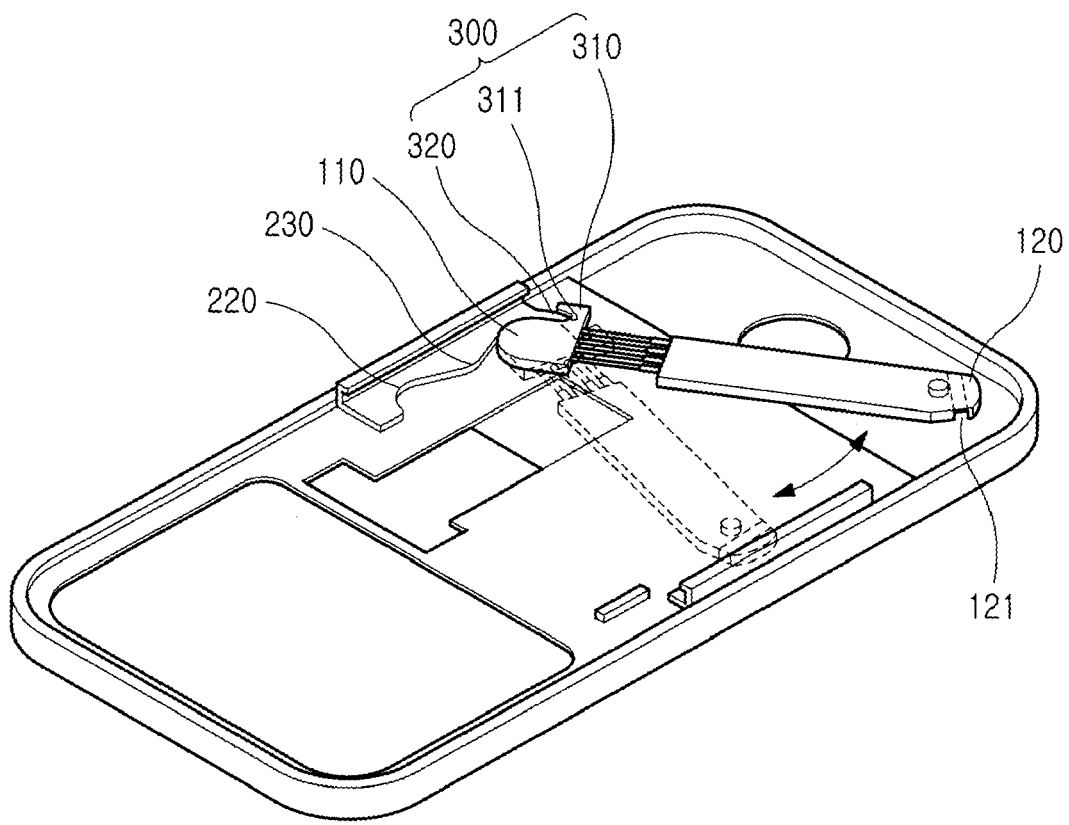
FIG. 6 is a view showing a locking member in a sliding module having a locking function in a portable electronic device when a support member and a push rod are assembled according to an exemplary embodiment of the present invention.
Figure 7:
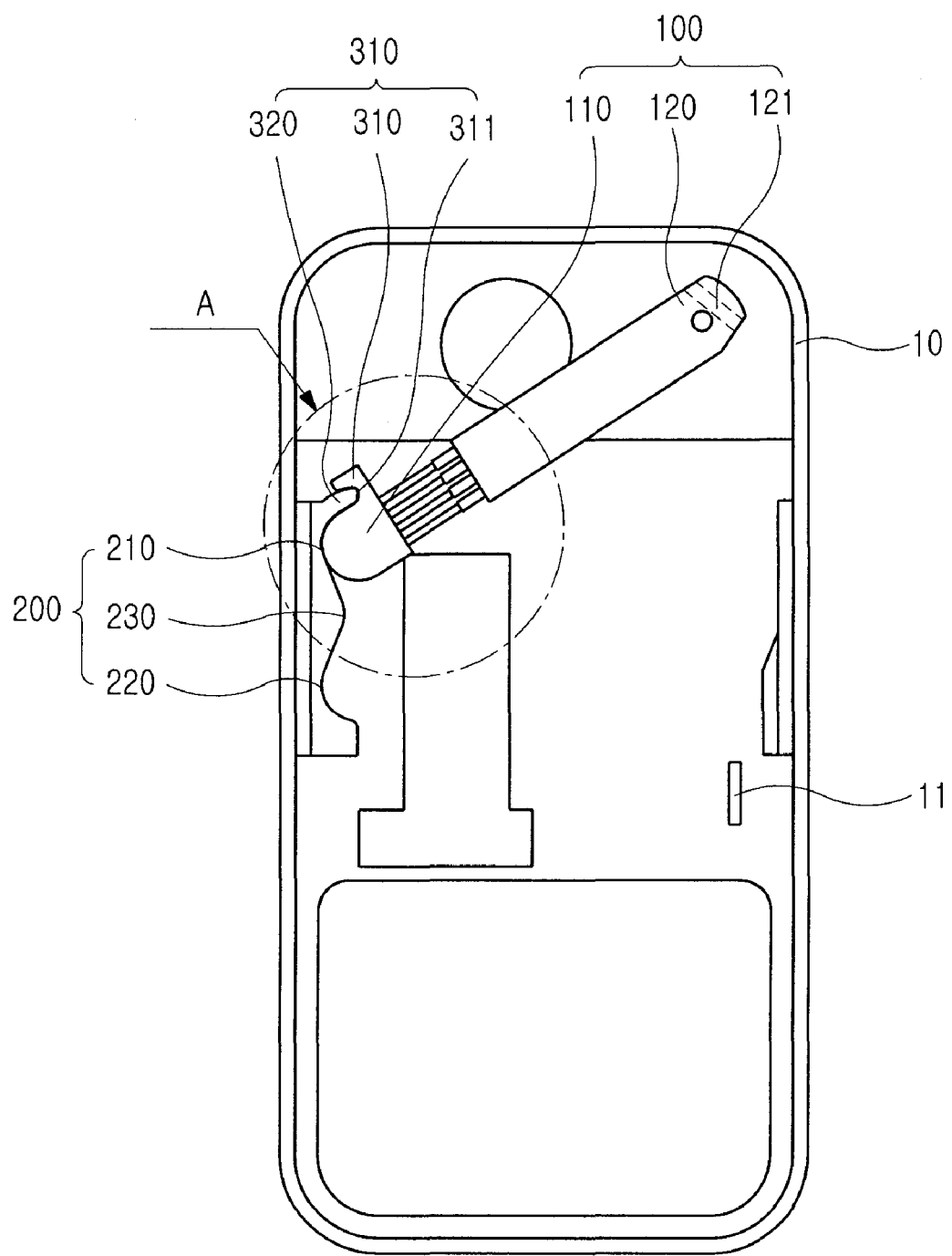
FIG. 7 is a perspective view showing a state where a sliding housing slides toward one side of a main housing in a sliding module having a locking function in a portable electronic device according to an exemplary embodiment of the present invention.
Figure 8:
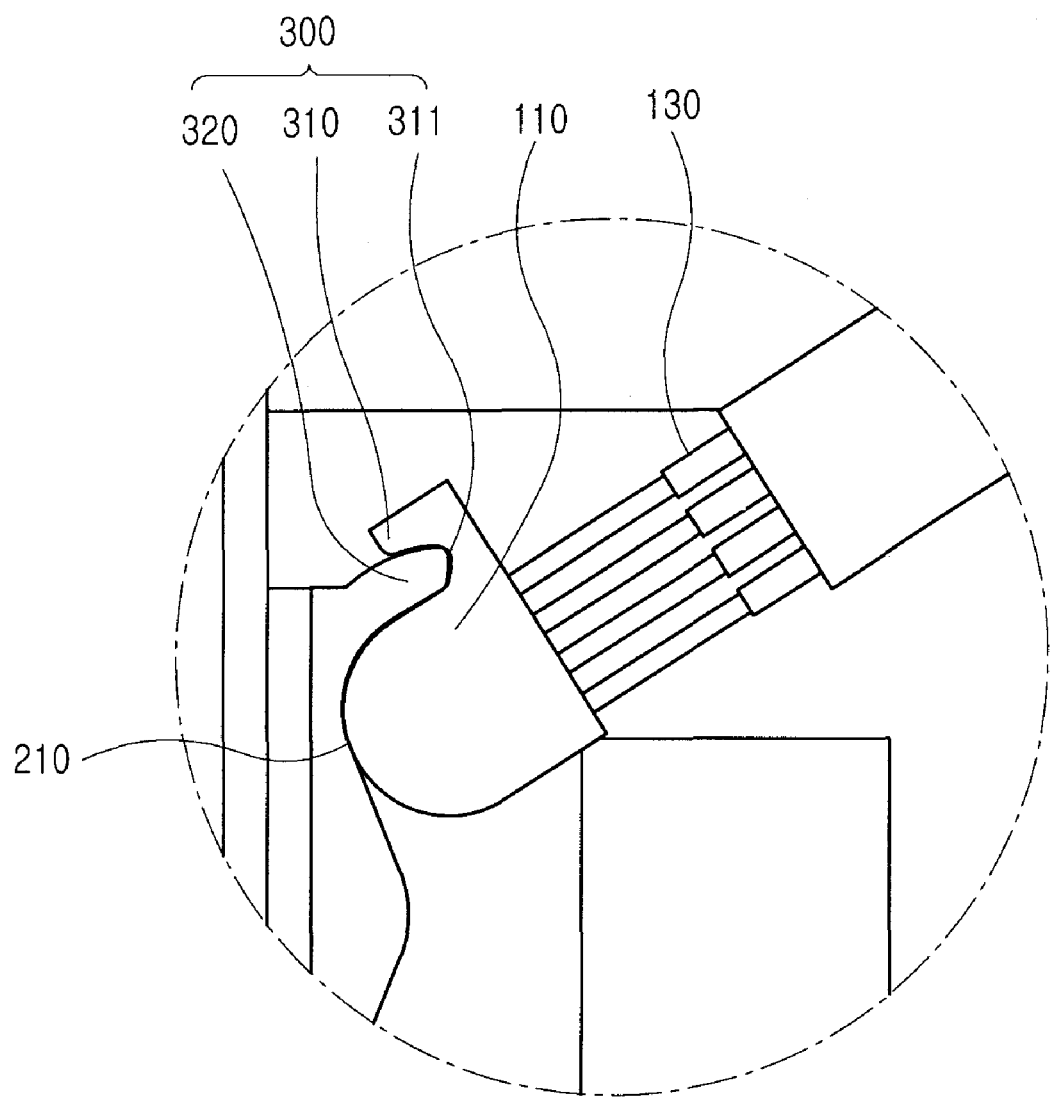
FIG. 8 is a perspective view showing an operation state of a locking member when a sliding housing slides toward one side of a main housing in a sliding module having a locking function in a portable electronic device according to an exemplary embodiment of the present invention.
Figure 12:
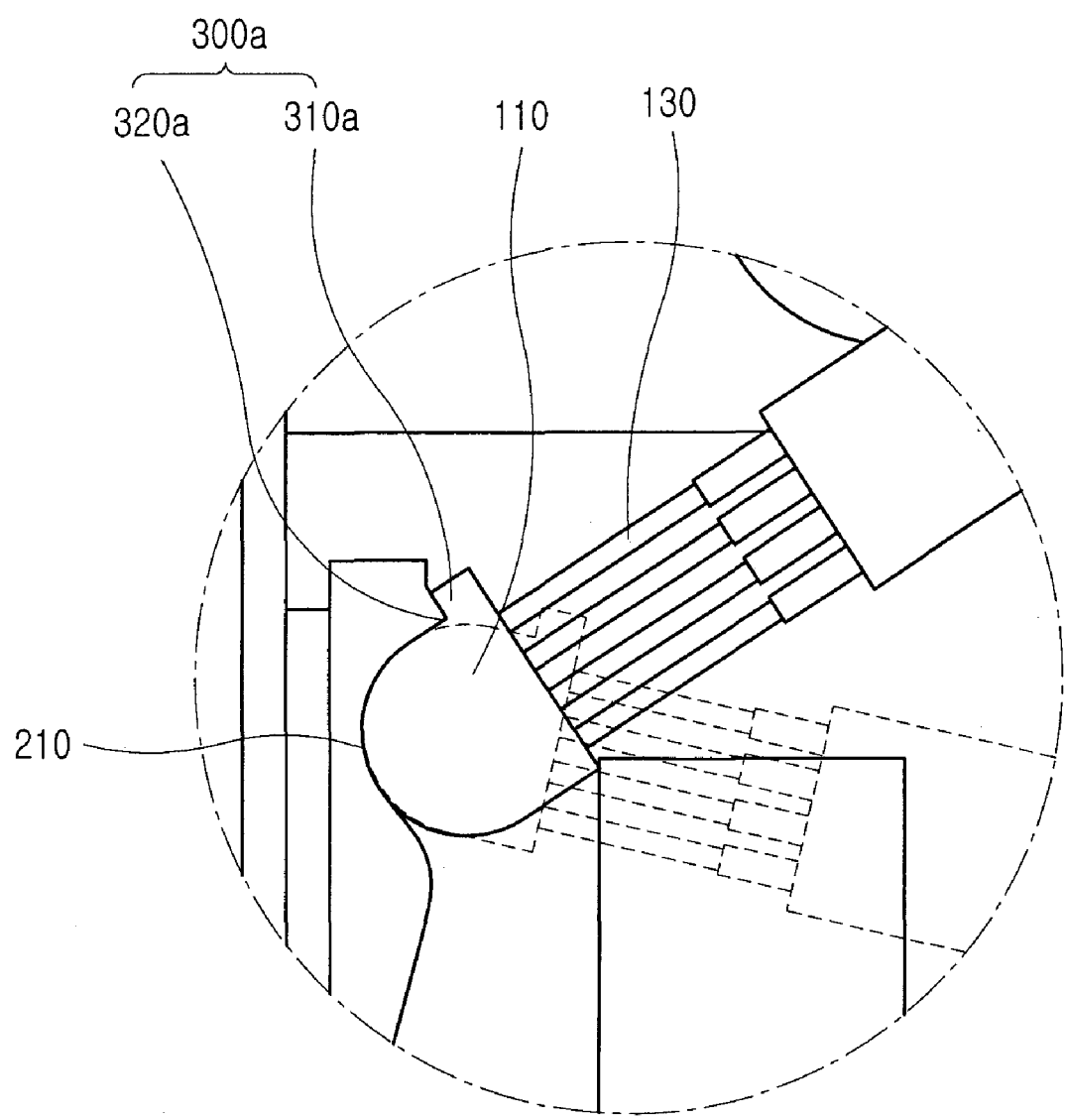
FIG. 12 is a perspective view showing an operation state of a locking member when a sliding housing slides toward the other side of a main housing in a sliding module having a locking function in a portable electronic device according to an exemplary embodiment of the present invention.

As shown in FIG. 4, FIG. 6, and FIG. 12, a guide groove 121 is disposed on a surface of the sliding support body 120 facing the main housing to guide the sliding of the sliding housing 20, and a stopper protrusion 11 protrudes from the main housing 10 to be engaged with and disengaged from the guide groove 121. When the support body 110 slides from the upper groove 210 to the lower groove 220, the guide groove 121 is engaged with the stopper protrusion 11 to guide the sliding support body 120 on the main housing 10.

As shown in FIG. 5, FIG. 6, FIG. 7, FIG. 8, and FIG. 9, when the sliding housing 20 slides toward a first side of the main housing 10 while facing the main housing 10 from a state in which the sliding housing 20 is closed on the main housing 10, the support body 110 rotates on the upper groove 210, and at the same time the locking protrusion 320 is inserted in the latching groove 311 and the latching protrusion 310 is engaged with the locking protrusion 320 to block the push rod 100. Then, the sliding support body 120 slides in the sliding direction of the sliding housing 20 to open the other side surface of the main housing 10. When the sliding housing 20 slides toward a second side of the main housing 10 from a state in which the first side surface of the main housing is open, the support body 110 rotates on the upper groove 210, and at the same time the locking protrusion 320 is disengaged from the latching groove 311. Further, the sliding support body 120 slides in the sliding direction of the sliding housing 20 so that the sliding housing 20 is closed on the main housing 10 while facing the main housing 10.

Referring to FIG. 5, FIG. 6, FIG. 11, and FIG. 12, when the sliding housing 20 slides toward the other side of the main housing 10 while facing the main housing 10 from a state in which the sliding housing 20 is closed on the main housing 10, the support body 110 separates from the upper groove 210 to slide along the guide protrusion 230 and be positioned on the lower groove 220. Further, when the sliding support body 120 slides in the sliding direction of the sliding housing 20 and the stopper protrusion 11 is engaged with the guide groove 121, the sliding support body 120 is guided and stopped.

An operating process of the sliding module for the portable electronic device having the above-described configuration according to an exemplary embodiment of the present invention will be described in more detail with reference to FIG. 4, FIG. 5, FIG. 6, FIG. 7, FIG. 8, FIG. 9, FIG. 10, FIG. 11, and FIG. 12.

Figure 5:
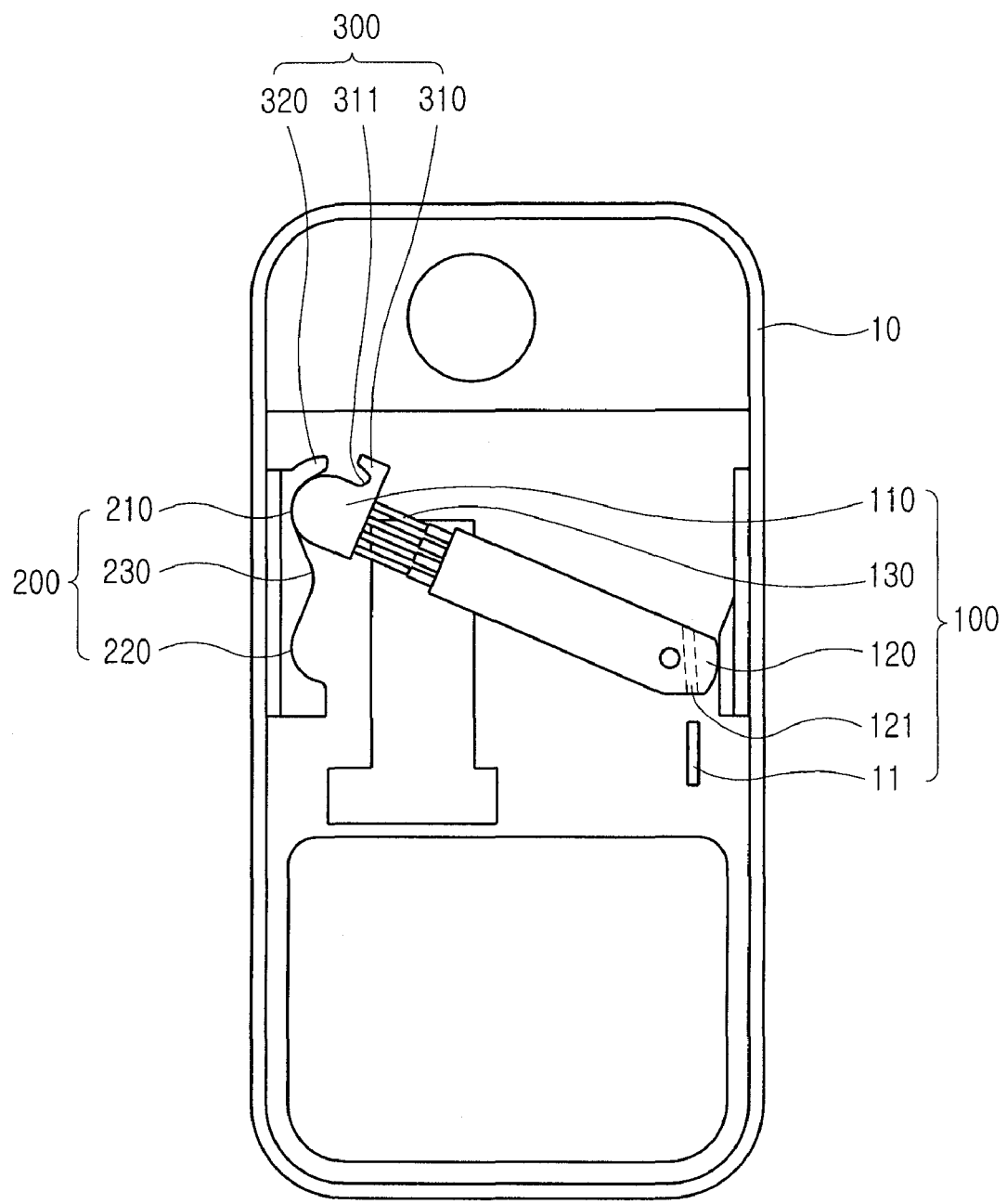
FIG. 5 is an perspective view showing a sliding-type portable terminal employing a sliding module having a locking function in a portable electronic device according to an exemplary embodiment of the present invention.

As shown in FIG. 7, FIG. 8, FIG. 9, and FIG. 10, when the sliding housing 20 slides toward one side of the main housing 10 while facing the main housing 10 from the state in which the sliding housing 20 is closed on the main housing 10 as shown in FIG. 5 and FIG. 6, and the other side surface of the main housing 10 is opened, the support body 110 of the push rod 100 rotates on the upper groove 210.

The latching protrusion 310 protruding from the support body 110 rotates along the rotation of the support body 110, and the locking protrusion 320 is engaged with the latching groove 311 disposed between the support body 110 and the latching protrusion 310 to be engaged with the latching groove 311.

The sliding support body 120 slides about the support body 110 positioned on the upper groove 210 when the sliding housing 20 slides.

The locking protrusion 320 is inserted into and engaged with the latching groove 311 disposed between the support body 110 and the latching protrusion 310, the sliding housing 20 opens the second side surface of the main housing 10, and then the sliding of the sliding housing 20 comes to a stop.

From this state, when the sliding housing 20 slides to close the main housing 10, the sliding support body 120 slides according to the sliding housing 20, and the support body 110 rotates on the upper groove 210.

The support body 110 rotates in the counter direction against its rotation direction on the upper groove 210 when the sliding housing 20 slides toward a first side of the main housing 10, so that the locking protrusion 320 is gradually separated from the latching groove 311.

The latching protrusion 310 continues to be engaged with the locking protrusion 320 until the sliding housing 20 slides toward the main housing 10, so that the support body 110 is limited from sliding. Therefore, the support body 110 can only rotate on the upper groove 210 and is not separated from the upper groove 210.

Figure 11:
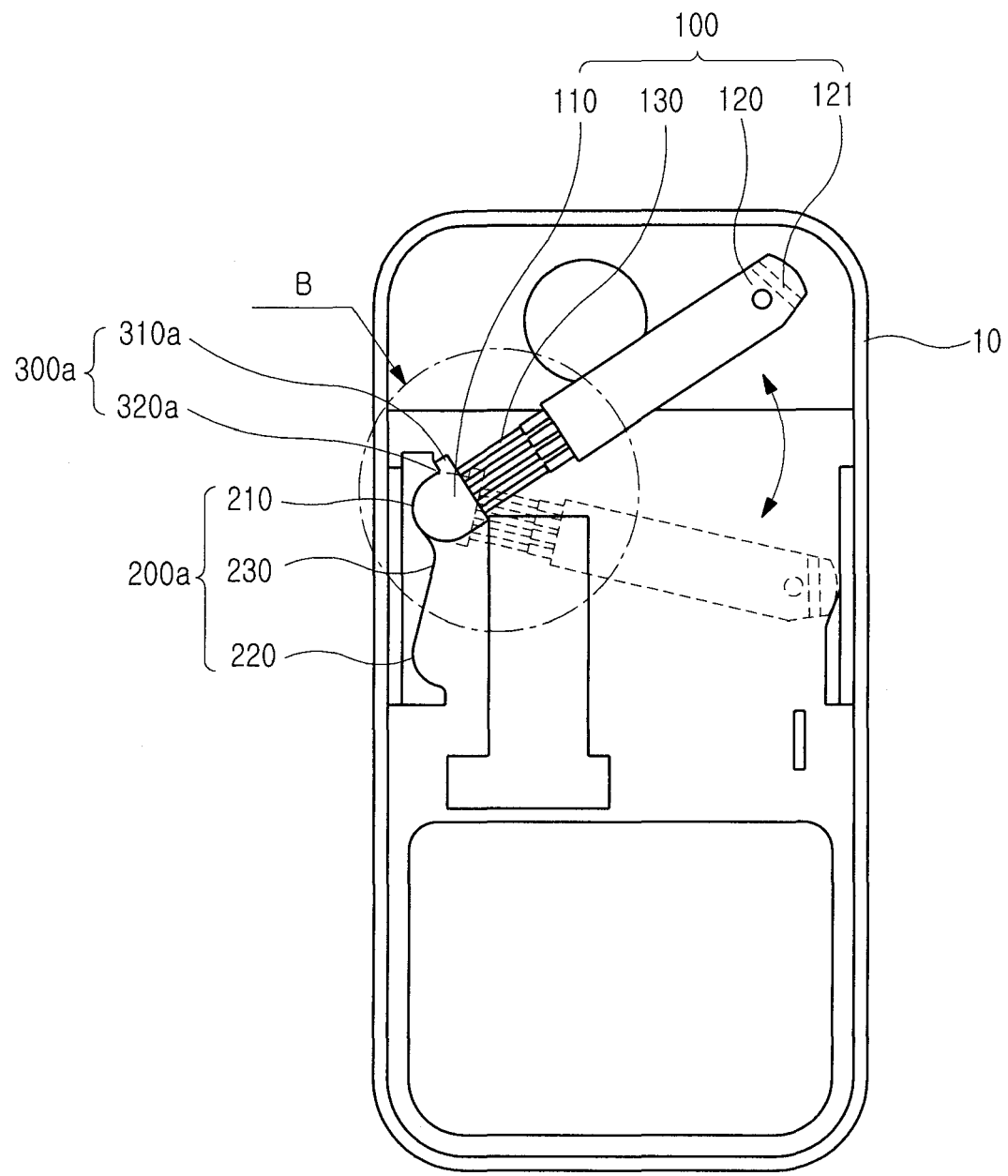
FIG. 11 is a perspective view showing a state where a sliding housing slides toward the other side of a main housing in a sliding module having a locking function in a portable electronic device according to an exemplary embodiment of the present invention.

As shown in FIG. 11 and FIG. 12, when the sliding housing 20 slides toward the second side of the main housing 10 while facing the main housing 10 from a state in which the sliding housing 20 is closed on the main housing 10, as shown in FIG. 5 and FIG. 6, a first side surface of the main housing 10 is opened and the push rod 100 slides along the sliding housing 20.

Figure 9:
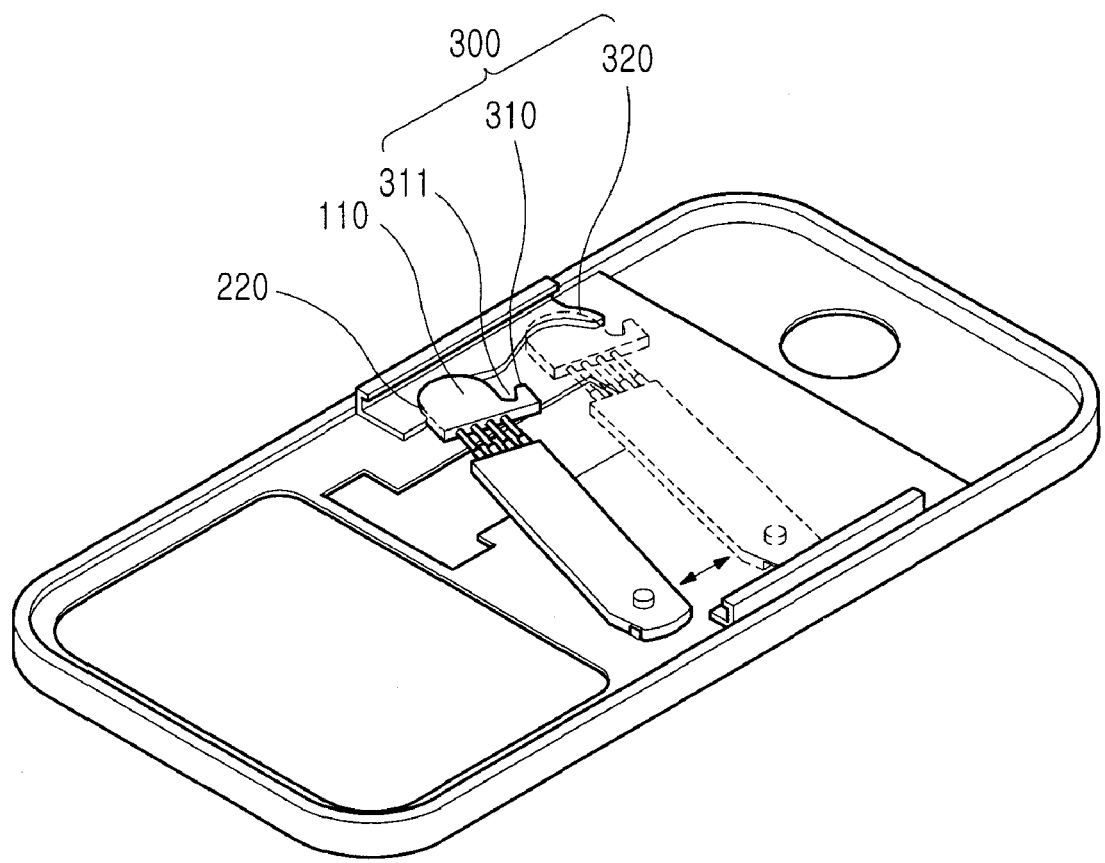
FIG. 9 is a plane view showing a mounting state of a locking member when a sliding housing slides toward one side of a main housing in a sliding module having a locking function in a portable electronic device according to an exemplary embodiment of the present invention.
Figure 10:
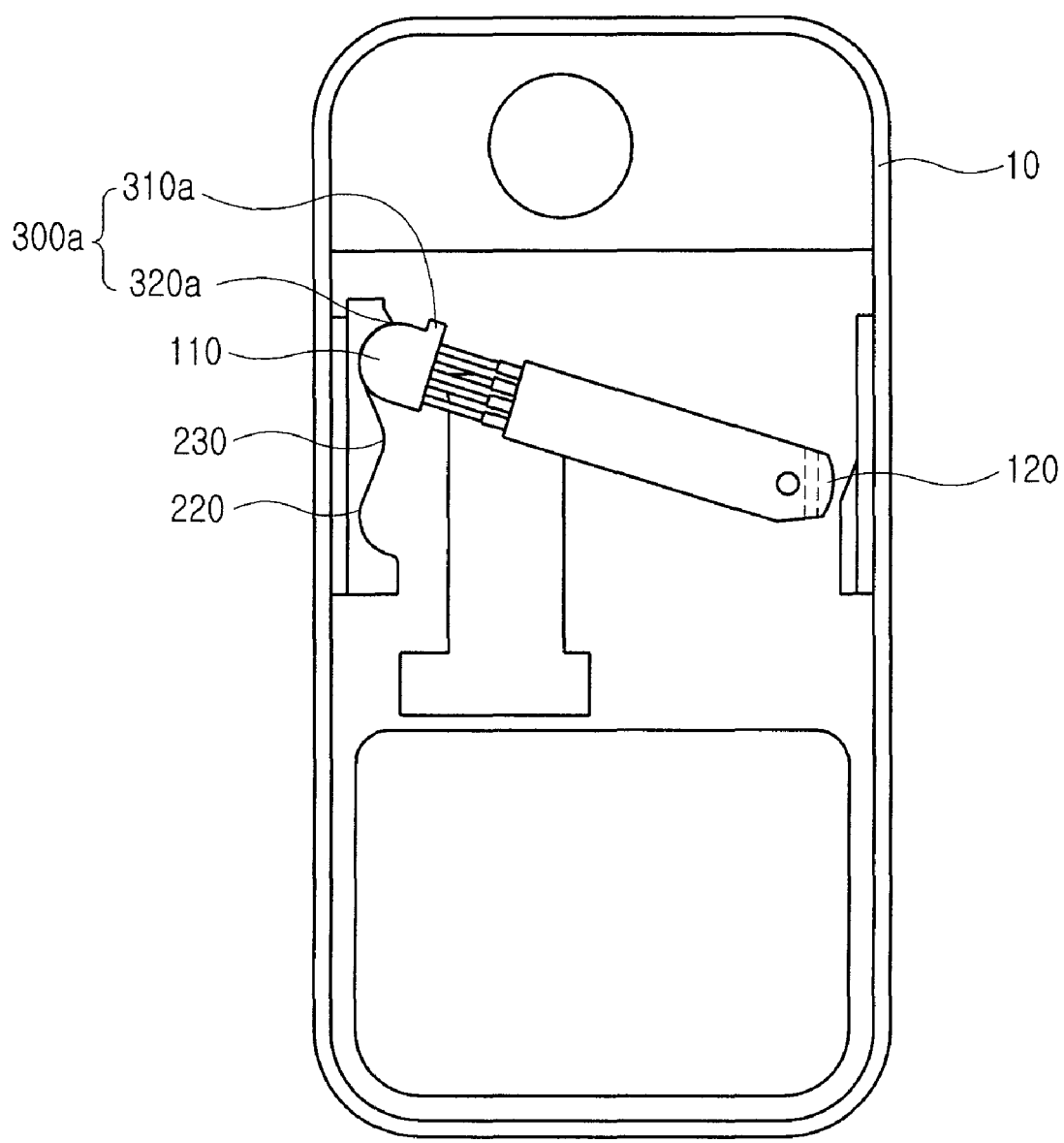
FIG. 10 is an enlarged view of part A of FIG. 9.

As shown in FIG. 9, the support body 110 is separated from the upper groove 210 to slide, and moves along the guide protrusion 230 to be positioned on the lower groove 220. Further, the sliding support body 120 slides toward the other side of the main housing 10 along the sliding housing 20.

When the sliding support body 120 slides toward the other side of the main housing 10, the guide groove 121 is engaged with the stopper protrusion 11, so that the guide groove 121 prevents the sliding support body 120 from being separated from an external side of the main housing 10 and guides the sliding of the sliding support body 120 during the sliding of the sliding support body 120. Therefore, the sliding housing 20 slides toward the other side of the main housing 10 so that one side surface of the main housing 10 is opened.

When the sliding housing 20 slides toward the main housing 10, the push rod 100 slides toward one side of the main housing 10 according to the sliding housing 20.

The support body 110 positioned on the lower groove 220 slides along the guide protrusion 230 and is positioned on the upper groove 210, and the sliding support body 120 is separated from the protrusion stopper 11 and slides along the sliding housing 20, so that the sliding housing 20 is closed on the main housing 10.

As described above, the latching protrusion 310 is engaged with the locking protrusion 320 to be locked or the latching protrusion 310 is disengaged from the locking protrusion 320 to be released from the lock according to the rotation of the support body 111, so that the push rod 100 may be limited from sliding on the upper groove. Therefore, the push rod may be stably driven, even though the sliding housing 20 slides while the locking protrusion 320 is engaged with the latching groove 311.

Further, because the locking protrusion 320 is engaged with the latching groove 311 when the sliding housing 20 slides, the guide protrusion 230 protruding to prevent the support body 110 from sliding may have a smaller thickness than that of the conventional guide protrusion. Therefore, the sliding operation in the sliding-type portable terminal may be effectively improved.

FIG. 13, FIG. 14, FIG. 15, and FIG. 16 show a locking member in the sliding module for a portable electronic device according to another exemplary embodiment of the present invention.

Figure 13:
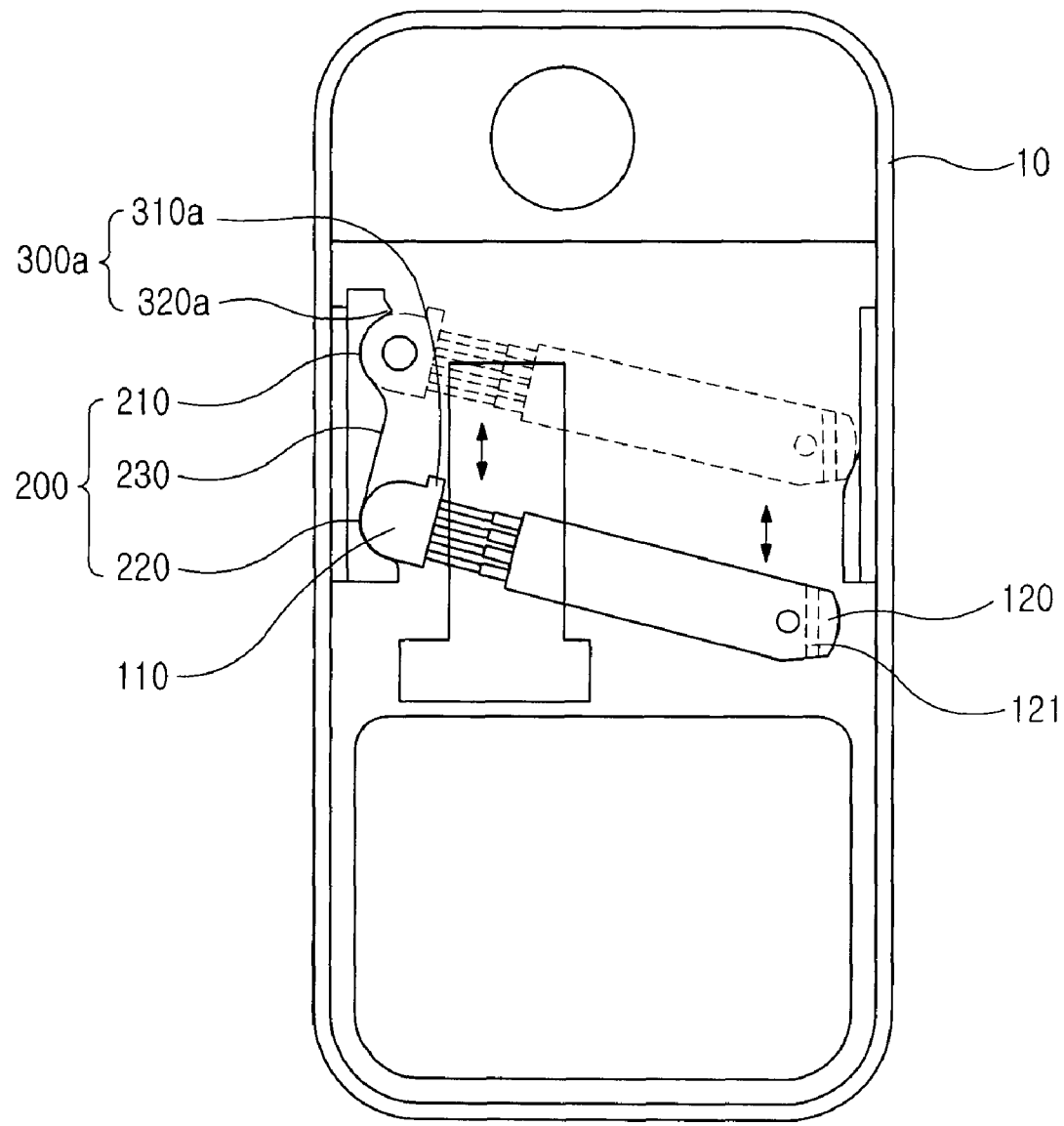
FIG. 13 is a view showing a locking member in a sliding module having a locking function in a portable electronic device according to another exemplary embodiment of the present invention.

Referring to FIG. 13, a first locking portion 310a includes a latching protrusion 310a protruding from one side surface of a support body 120 in a vertical direction, and a second locking portion 320a includes a locking protrusion 320a protruding from the support member 200 in a vertical direction with respect to a longitudinal direction of the support member 200 and is engaged with all surface of the latching protrusion 310a to limit the support body 120 from sliding on and being separated from the upper groove 210.

Figure 14:
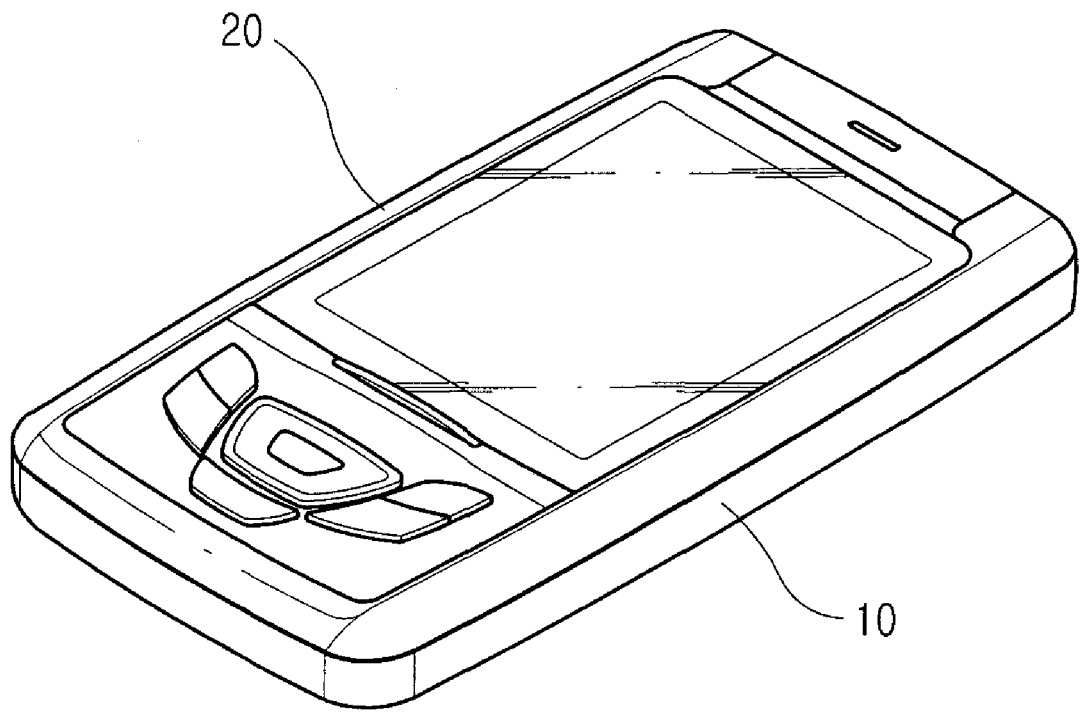
FIG. 14 is a view showing an operation state of a locking member when a sliding housing slides toward one side of a main housing of FIG. 13.
Figure 15:
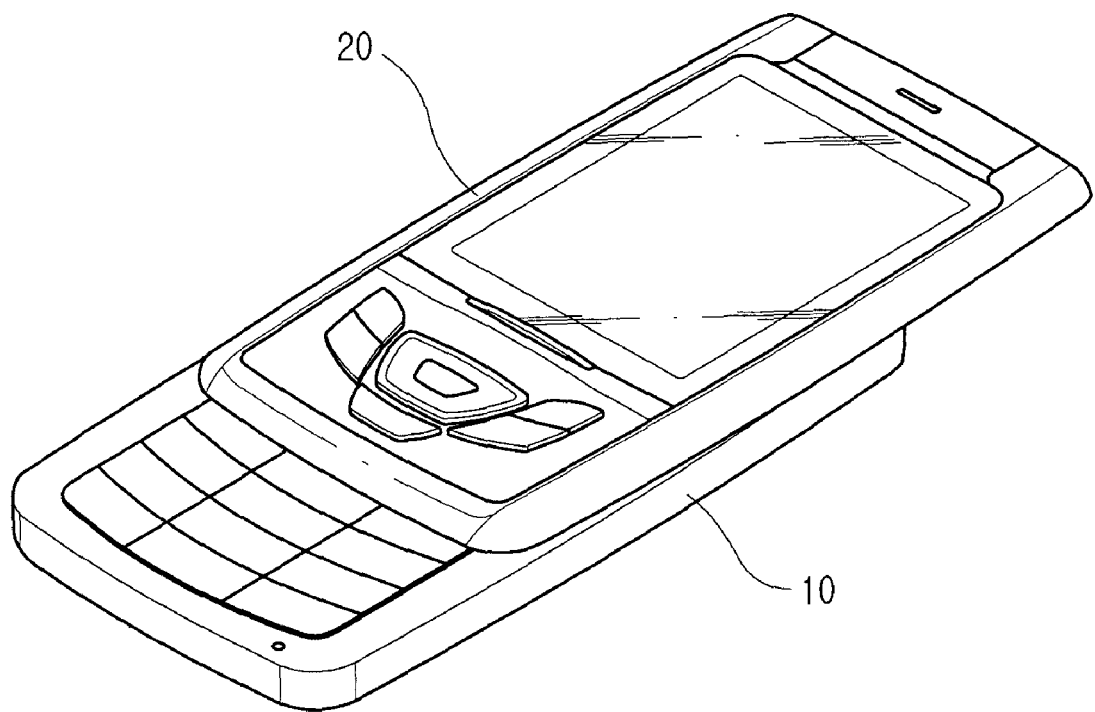
FIG. 15 an enlarged view of part B of FIG. 13.

From this state, as shown in FIG. 14 and FIG. 15, when the sliding housing 20 slides toward one side of the main housing 10 while facing the main housing 10 from a state in which the sliding housing 20 is closed on the main housing 10, as shown in FIG. 13, and the second side surface of the main housing 10 is opened, the support body 110 rotates on the upper groove 210, and at the same time the latching protrusion 310a rotates to be engaged with the locking protrusion 320a.

Further, the sliding support body 120 slides together with the sliding housing 20 about the support body 110 positioned on the upper groove 210.

Even though force is applied to slide the sliding housing 20 in the counter direction, the latching protrusion 310a and the locking protrusion 320a are in contact with and are blocked by each other, so the support body 110 is limited from sliding on and being separated from the upper groove 210.

Therefore, even though the sliding housing slides from a state in which the sliding housing 20 slides to an upper side of the main housing 10 and the support body 110 rotates on the upper groove 210, the support body 110 can only rotate and is not separated from the upper groove 210.

Figure 16:
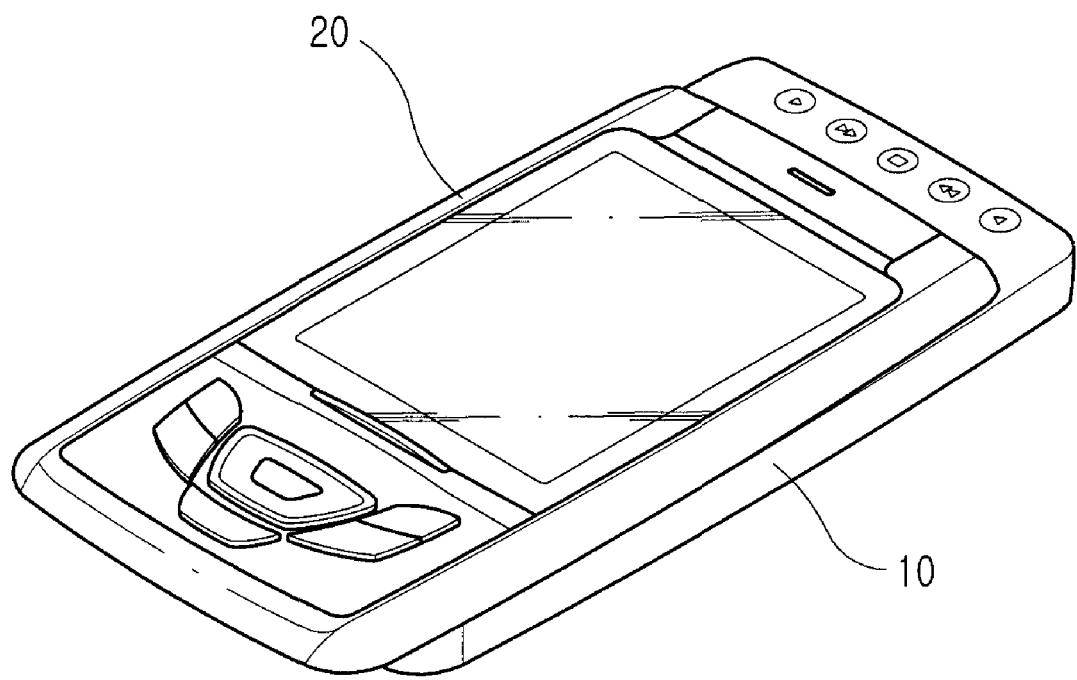
FIG. 16 is a view showing the operation of a locking member when a sliding housing slides toward the other side of a main housing of FIG. 13.

As shown in FIG. 16, when the sliding housing 20 slides toward the other side of the main housing 10 while facing the main housing 10 from a state in which the sliding housing 20 is closed on the main housing 10, as shown in FIG. 5 and FIG. 6, and one side surface of the main housing 10 is opened, the support body 110 is separated from the upper groove 210 and slides along the guide protrusion 230 to be positioned on the lower groove 220, and the sliding support body 120 slides toward the other side of the main housing 10 according to the sliding of the sliding housing 20.

The stopper protrusion 11 is engaged with the guide groove 121 to prevent the sliding support body 120 from being separated from the outside of the main housing 10 and the guide groove 121 guides the sliding of the sliding support body 120.

Therefore, the sliding housing 20 slides toward the other side of the main housing 10, and one side surface of the main housing 10 is opened. From this state, the sliding housing 20 slides to close the main housing 10 while facing the main housing 10, and the push rod 100 slides toward one side of the main housing 10 according to the sliding housing 20.

Exemplary embodiments of the present invention may be employed in all electronic devices employing the sliding module.

As described above, the sliding module having a locking function in the portable electronic device includes a locking member that locks or releases the push rod and the support member according to the sliding of the sliding housing. Therefore, in exemplary embodiments of the present invention, even if the sliding housing slides toward any one side of the main housing and the support body rotates on the upper groove, the support body may be prevented from sliding on and being separated from the upper groove.

Further, the locking member may prevent the support body from sliding on and being separated from the upper groove, so the push rod may be operated in a stable manner when sliding the sliding housing, and may improve the operation of the sliding-type portable terminal.

Furthermore, because the locking protrusion is engaged with the latching groove, the push rod is not separated from the upper groove. Therefore, the width of the guide protrusion protruding between the upper groove and the lower groove to limit the sliding may be decreased.

Moreover, by decreasing the width of the guide protrusion, the support body may slide smoothly from the upper groove to the lower groove or from the lower groove to the upper groove. Because the sliding housing may easily slide, and the sliding operation may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A sliding module comprising:
    a main housing;
    a sliding housing of the main housing;
    a push rod to provide an elastic force to slide the sliding housing associated with the main housing;

a support member of the main housing provided rotatably and slidably to couple the push rod; and a locking member comprising a first locking portion disposed on the push rod and a second locking portion disposed on the support member respectively, the first locking portion comprising a protruding portion and a recessed portion to rotatably engage and disengage the second locking portion comprising a protruding portion, wherein the push rod is rotatably engaged with the support member and rotatably disengaged from the support member according to the sliding housing which is opened or closed with respect to the main housing.

2. The sliding module of claim 1, wherein
the protruding portion and the recessed portion of the push rod and
the protruding portion of the support member are rotatably engaged or disengaged according to the rotation of the push rod.

3. The sliding module of claim 2, wherein a first end of the push rod comprises a support body that rotates or slides on the support member,
wherein the first locking portion protrudes from one side of the support body, and
wherein the first locking portion engages with the second locking portion according to the rotation of the support body to block the support body from sliding on the support member, and disengages from the second locking portion to separate the first locking portion from the support member.

4. The sliding module of claim 3, wherein the first locking portion comprises a latching protrusion protruding from one side of the support body.

5. The sliding module of claim 4, wherein a latching groove is disposed on the support body and adjacent to the latching protrusion, the latching groove to engage with the second locking portion.

6. The sliding module of claim 5, wherein the support member comprises
an upper groove to engage with the support body in a sliding direction, and a lower groove formed adjacent to the upper groove, and
a guide protrusion disposed between the upper groove and the lower groove to guide a movement of the support body from the upper groove to the lower groove,
wherein the second locking portion protrudes from the upper groove, and
wherein the second locking portion is inserted into the latching groove and engages with the latching protrusion according to the rotation of the support body to block the support body from sliding, and disengages from the latching protrusion according to the rotation of the support body to allow the support body to slide.

7. The sliding module of claim 6, wherein the second locking portion comprises a locking protrusion protruding from the upper groove.

8. The sliding module of claim 3, further comprising:
a sliding support body disposed on a second end of the push rod and is coupled with the sliding housing; and
a guide groove disposed on a surface of the sliding support body that faces the main housing to guide the sliding support body to slide on the main housing according to the sliding of the sliding housing, the sliding support body sliding and the guide groove to engage with a stopper protrusion protruding from the main housing to guide the sliding support body when the support body slides from the upper groove to the lower groove according to the sliding of the sliding housing.

9. The sliding module of claim 8, wherein
the support body rotates on the upper groove when the sliding housing slides toward a first side of the main housing while facing each the main housing from a state in which the sliding housing is closed on the main housing and the locking protrusion is simultaneously inserted in the latching groove so that the sliding support body slides in the sliding direction of the sliding housing to open a second side surface of the main housing, and
the support body rotates on the upper groove when the sliding housing slides toward a second side of the main housing from a state in which a first side surface of the main housing is open and the locking protrusion is simultaneously disengaged from the latching groove so that the sliding support body slides in the sliding direction of the sliding housing to close the sliding housing on the main housing.

10. The sliding module of claim 9, wherein
the locking protrusion is separated from the upper groove when the sliding housing slides toward a first side of the main housing while facing the main housing from a state in which the sliding housing is closed on the main housing, and slides along the guide protrusion to be positioned on the lower groove, and the sliding support body simultaneously slides in the sliding direction of the sliding housing and the stopper protrusion is inserted in the guide groove so that the movement of the sliding support body stops.

11. A sliding module comprising:
a main housing;
a sliding housing of the main housing;
an elastic member to provide an elastic force to slide the sliding housing associated with the main housing;
a support member of the main housing provided rotatably to couple the elastic member to guide a movement of the elastic member, wherein
the elastic member comprising a protruding portion and a recessed portion and the support member comprising a protruding portion to rotatably engage and disengage the elastic member and the support member according to the sliding housing which is opened or closed with respect to the main housing.

12. The sliding module of claim 11, wherein the recessed portion of the elastic member and
the protruding portion of the support member are rotatably engaged with each other or rotatably disengaged according to the rotation of the elastic member.

13. The sliding module of claim 12, wherein a first end of the elastic member comprises a support body that rotates or slides on the support member,
wherein the first locking portion protrudes from one side of the support body, and
wherein the first locking portion engages with the second locking portion according to the rotation of the support body to block the support body from sliding on the support member, and disengages from the second locking portion to separate the first locking portion from the support member.

14. The sliding module of claim 13, wherein the first locking portion comprises a latching protrusion protruding from the one side of the support body.

15. The sliding module of claim 14, wherein a latching groove is disposed on the support body and adjacent to the latching protrusion, the latching groove to engage with the second locking portion.

16. The sliding module of claim 15, wherein the support member comprises:

an upper groove to engage with the support body in a sliding direction, and a lower groove formed adjacent to the upper groove, and a guide protrusion disposed between the upper groove and the lower groove to guide a movement of the support body from the upper groove to the lower groove, wherein the second locking portion protrudes from the upper groove, and wherein the second locking portion is inserted into the latching groove and engages with the latching protrusion according to the rotation of the support body to block the support body from sliding, and disengages from the latching protrusion according to the rotation of the support body to allow the support body to slide.

17. The sliding module of claim 16, wherein the second locking portion comprises a locking protrusion protruding from the upper groove.

18. The sliding module of claim 13, further comprising:

a sliding support body disposed on a second end of the elastic member and assembled with the sliding housing; and a guide groove disposed on a surface of the sliding support body that faces the main housing to guide the sliding support body on the main housing according to the sliding of the sliding housing, the sliding support body to slide and the guide groove to engage with a stopper protrusion protruding from the main housing to guide the sliding support body when the support body slides from the upper groove to the lower groove according to the sliding of the sliding housing.

19. The sliding module of claim 18, wherein the support body rotates on the upper groove when the sliding housing slides toward a first side of the main housing while facing the main housing from a state in which the sliding housing is closed on the main housing and the locking protrusion is inserted in the latching groove so that the sliding support body slides in the sliding direction of the sliding housing to open a second side surface of the main housing, and the support body rotates on the upper groove when the sliding housing slides toward a second side of the main housing from a state in which a first side surface of the main housing is open and the locking protrusion is simultaneously disengaged from the latching groove so that the sliding support body slides in the sliding direction of the sliding housing to close the sliding housing on the main housing.

20. The sliding module of claim 19, wherein the support body is separated from the upper groove when the sliding housing slides toward a first side of the main housing while facing the main housing from a state in which the sliding housing is closed on the main housing, and slides along the guide protrusion to be positioned on the lower groove, and the sliding support body simultaneously slides in the sliding direction of the sliding housing and the stopper protrusion is inserted in the guide groove so that the movement of the sliding support body stops.

* * * * *